(12) United States Patent
Sampara et al.

(10) Patent No.: US 11,731,121 B2
(45) Date of Patent: Aug. 22, 2023

(54) PROCESS FOR PREPARATION OF HIGHLY COORDINATED SULFATED MIXED METAL OXIDE CATALYST HAVING HIGH CRUSHING STRENGTH

(71) Applicants: Viridis Chemicals Private Limited, Mumbai (IN); Indian Oil Corporation Limited, Mumbai (IN)

(72) Inventors: Chaitanya Sampara, Mumbai (IN); Pushkar Varshney, Faridabad (IN); Reshmi Manna, Faridabad (IN); Saravanan Subramani, Faridabad (IN); Madhusudan Sau, Faridabad (IN); Debasis Bhattacharyya, Faridabad (IN); Sankara Sri Venkata Ramakumar, Faridabad (IN)

(73) Assignees: Viridis Chemicals Private Limited, Mumbai (IN); Indian Oil Corporation Limited, Mumbai (IN)

( * ) Notice: Subject to any disclaimer, the term of this patent is extended or adjusted under 35 U.S.C. 154(b) by 120 days.

(21) Appl. No.: 17/178,619

(22) Filed: Feb. 18, 2021

(65) Prior Publication Data
US 2021/0252495 A1    Aug. 19, 2021

(30) Foreign Application Priority Data
Feb. 19, 2020    (IN) .............................. 202021007171

(51) Int. Cl.
*B01J 35/00* (2006.01)
*B01J 21/06* (2006.01)
(Continued)

(52) U.S. Cl.
CPC ......... *B01J 35/0046* (2013.01); *B01J 21/066* (2013.01); *B01J 23/42* (2013.01); *B01J 23/44* (2013.01); *B01J 31/04* (2013.01); *B01J 35/023* (2013.01); *B01J 37/0009* (2013.01); *B01J 37/0036* (2013.01); *B01J 37/0045* (2013.01); *B01J 37/0236* (2013.01); *B01J 37/031* (2013.01)

(58) Field of Classification Search
CPC .... B01J 35/0046; B01J 35/023; B01J 21/066; B01J 23/42; B01J 23/44; B01J 31/04; B01J 37/0009; B01J 37/0036; B01J 37/0045; B01J 37/0236; B01J 37/031
See application file for complete search history.

(56) References Cited

U.S. PATENT DOCUMENTS

| 3,637,525 | A | 1/1972 | O'Hara |
| 5,108,975 | A | 4/1992 | Schubert et al. |

(Continued)

*Primary Examiner* — Melissa S Swain
*Assistant Examiner* — Catriona M Corallo
(74) *Attorney, Agent, or Firm* — Workman Nydegger

(57) ABSTRACT

The present invention provides a process of preparing a high coordination sulfated mixed metal oxide catalyst. The process comprises mixing specific ratios of alumina and zirconia mixtures at specific particle size limits which do not exceed 37 μm, in the presence of a combination of α-amino acids, i.e., non-polar side chains and basic side chains having molecular weight less than 250, nitric acid (HNO3) and sulfuric acid (H2SO4) at a pH range of 1.5 to 3.8 at temperatures below 30° C. The catalysts have a high conversion towards hydrocarbon isomerization reaction while concurrently having crushing strength in range of 2.0 daN and 5.0 daN, allowing for efficient commercial application.

9 Claims, 4 Drawing Sheets

(51) Int. Cl.
  *B01J 23/42* (2006.01)
  *B01J 23/44* (2006.01)
  *B01J 31/04* (2006.01)
  *B01J 35/02* (2006.01)
  *B01J 37/00* (2006.01)
  *B01J 37/02* (2006.01)
  B01J 37/03 (2006.01)

(56) References Cited

U.S. PATENT DOCUMENTS 6,326,328 B1 12/2001 Matsuzawa
6,709,570 B1 3/2004 Crijnen-Beers et al.
2007/0123745 A1 5/2007 Herbst et al.

*B#1, B#2 and B#3 in the above figures correspond to catalysts 1, 2 and 3, respectively.

PROCESS FOR PREPARATION OF HIGHLY COORDINATED SULFATED MIXED METAL OXIDE CATALYST HAVING HIGH CRUSHING STRENGTH

FIELD OF THE INVENTION

The present invention relates to a process of preparing a high coordination sulfated mixed metal oxide catalyst with crushing strength of at least 2.0 daN. Moreover, the invention discloses mixing specific ratios of alumina and zirconia mixtures at specific particle size limits which do not exceed 400 mesh (or 37 μm) in the presence of a combination of α-amino acids having molecular weight less than 250, nitric acid ($HNO_3$) and sulfuric acid ($H_2SO_4$) at a pH range of 1.5 to 3.8 at temperatures below 30° C. to achieve the desired crushing strength.

BACKGROUND OF THE INVENTION

Implementation of stringent environmental regulation forced refiners to produce high octane gasoline without adding any lead additive with limitation on aromatic content. Isomerization is one of the refining processes to produce high octane gasoline using straight run naphtha as a feed. This process converts the straight paraffinic and naphthenic hydrocarbon stream to respective isomers whose octane is higher than that of straight chain hydrocarbon. The feed to the isomerization process also comprises some of the isomers and aromatics which depend upon the source of crude. Three types of catalyst are employed for isomerization process: Pt-chlorinated alumina, Pt-sulfated mixed metal oxide and Pt-zeolite. These catalysts are commercially employed in fixed bed reactors. The commercial catalyst should be of high activity along with high stability to ensure better conversion of feed and good catalyst life. Besides this, the strength of the catalyst should be high enough to avoid fines formation which ultimately leads to high pressure drop across reactor and affects the unit throughput. The crushing strength is one of the important physical properties of the catalyst and mainly dependent on the method of preparation.

In U.S. Pat. No. 3,637,525, a method of manufacturing an extruded catalyst composite of a group VII metal, a group VIB metal and a refractory carrier material and characterized by low bulk density and of sufficient strength was given. The catalyst composite was used for hydrofining of the residual oil. In the method of preparation, a refractory inorganic oxide is initially prepared as hydrogel. This was done by co-precipitation at a pH of 8-10. The washed hydrogel is then re-slurried in an aqueous solution of boric and phosphoric acid and the resultant composite are formed into extrudates. Binder may be employed during this. The extrudates are then impregnated with metals and followed by drying and calcinations to finally form the required catalyst.

In U.S. Pat. No. 5,108,975, a method for preparing a catalyst support material, comprising commercially available silica, by mixing with a fluorine containing acid is proposed followed by agglomeration and then calcination. The support material has significantly improved values of crushing strength and pore volume.

An invention for preparation of shaped solid acid catalyst for the isomerization of hydrocarbons and so on, which has a high activity and excellent in strength was described in U.S. Pat. No. 6,326,328B1. The invention comprises of following (a) kneading a hydroxide and/or hydrated oxide of aluminum, a hydroxide and/or hydrated oxide of zirconium and a sulfurous compound (b) shaping the kneaded mixture (c) calcining the shaped material (d) making group 8, 9 or 10 metal component supported on the calcined material (e) calcining the resultant material.

Further, in U.S. Pat. No. 6,709,570B1, a method of preparation of a catalyst with improved strength comprising of zeolite and a low acidity refractory binder free of alumina for used in catalytic dewaxing was given.

In US patent no. US 2007/0123745 A1, a process for preparation of a paraffin isomerization catalyst was given. The process includes the steps (a) contacting the hydroxide of group IVB metal with an aqueous solution of an oxyanion of group VIB metal to provide a mixture (b) drying the mixture (c) kneading the mixture with group IIIA hydroxyl gel and polymeric cellulose ether (d) extrusion followed by calcinations (e) impregnating calcined material with group VIII metals (f) calcinations. The addition of polymeric cellulose ether compound during catalyst preparation will substantially reduce the quantity of group IIIA metal as compared to conventional catalyst which leads to improve selectivity and lower cracking property.

Sulfated mixed metal oxide catalysts while are extremely useful acid catalysts for a variety of hydrocarbon conversion reactions, find it challenging in terms of commercial viability due to (1) Low stability of the catalyst to retain sulfur species when treated at elevated temperatures; treatment at high temperatures is required to obtain the desired level of acidity for the specific hydrocarbon reaction (2) Low crushing strength of the catalyst when formed into desired shapes to abet fines formation leading to pressure drop limitations.

Conventional catalyst synthesis methods include binders such as Pseudo-bohemite, precipitated silica etc., only as a strength inducing components of the catalyst. Typical background patents that define methods of preparing high crushing strength catalysts only focus on the concentration of the binder in combination with the catalyst material to achieve desired levels of catalyst crushing strength. Typical process of catalyst preparation includes (a) mixing desired ratios of catalyst and binder (to allow desired performance level of the catalyst without dilution effect of the binder) (b) kneading the mixture in the presence of acid/base to achieve desired level of peptization (c) extrude the mixture dough and (d) high temperature treatment of the extrude to achieve the final desired catalyst composition. Further, the catalysts defined in the background patents do not retain the high level of sulfate ion necessary for high catalytic activity under prolonged operation, a typical requirement for commercial refining catalysts.

This invention solves both these problems by intimately mixing the sulfated zirconia catalyst with an alumina-based binder at specific particle size and concentration levels in the presence of charged stabilizing acids. This intimate mixture allows thermal stabilization of sulfate species on the catalyst allowing larger concentrations of desired catalyst matrices to be present on the surface allowing higher reaction efficacy. Further, the catalyst crushing strength is remarkably increased thus allowing commercial applicability of the catalyst.

OBJECTIVES OF THE PRESENT INVENTION

A primary objective of the present invention is to provide a method of preparation of high coordination sulfated mixed metal oxide catalyst leading to increased reaction efficacy.

A further objective of the present invention provides a catalyst with high thermal stability required to produce optimal Lewis acidity of the catalyst.

A further objective of the present invention is to provide a catalyst having higher sulfate species retention which leads to optimal Bronsted acidity of the catalyst.

A further objective of the present invention is to provide a catalyst with high coordination number in the mixed metal oxide composition.

SUMMARY OF THE INVENTION

The present invention describes a high coordination sulfated mixed metal oxide catalyst. The process comprises mixing specific ratios of alumina and zirconia mixtures at specific particle size limits which do not exceed 400 mesh (or 37 μm) in the presence of a combination of α-amino acids having molecular weight less than 250, nitric acid ($HNO_3$) and sulfuric acid ($H_2SO_4$) at a pH range of 1.5 to 3.8 at temperatures below 30° C.

An embodiment the present invention provides a process for synthesis of high coordination sulfated mixed metal oxide catalyst, the process comprising:
a) dissolving Zirconium nitrate or acetate in distilled water;
b) Zirconium salt is precipitated using diethylamine, washed with double distilled water and dried;
c) sulfate ions are loaded on Zirconium salt using Ammonium sulfate or Ammonium persulfate with ammonia as the competing ion;
d) particle size of sulfur loaded Zirconium salt is reduced by milling from 310 μm to 44 μm;
e) high surface area acidified alumina particle size is reduced by milling from 90 μm to 44 μm, and mixed with Zirconium salt of step (d) in a ball mill to obtain a joint particle size of less than 37 μm;
f) mixture obtained in (e) is added to a binder liquid comprising of α-amino acids, $HNO_3$ and $H_2SO_4$ and mixed;
g) followed by settling time of 30 minutes for peptizing and extruded;
h) extrudates are dried at 100-200° C. for 6 hours followed by calcinations;
i) adding a hydrogenating component.

In an embodiment of the present invention, Zirconium hydroxide and Alumina are in the weight ratio of 3:1 to 5:1, having particle size less than 37 μm.

In another embodiment of the present invention, α-amino acid is a combination of α-amino acid with non-polar side chain and basic side chain.

In an embodiment of the present invention, α-amino acids, $H_2SO_4$ and $HNO_3$ are in weight ratio of 1:1:1 to 2.5:2.4:1.

In an embodiment of the present invention, extruder is a single screw axial extruder having thickness of 1-2 mm.

In another embodiment of the present invention, a binder is incorporated in the catalyst matrix to increase the coordination number of the main Lewis acid component of the catalyst (Zirconium).

In another embodiment of the present invention, acid mixture is used as peptizing agent to create the dough containing the binder and support materials prior to the extrusion process.

In another embodiment of the present invention, a mixture of organic and inorganic acids is used to selectively couple the binder and the support materials in specific functionalized direction.

In another embodiment of the present invention, the catalyst is having crushing strength greater than 2.0 daN and less than 5.0 daN.

DESCRIPTION OF THE INVENTION

Figure 1:
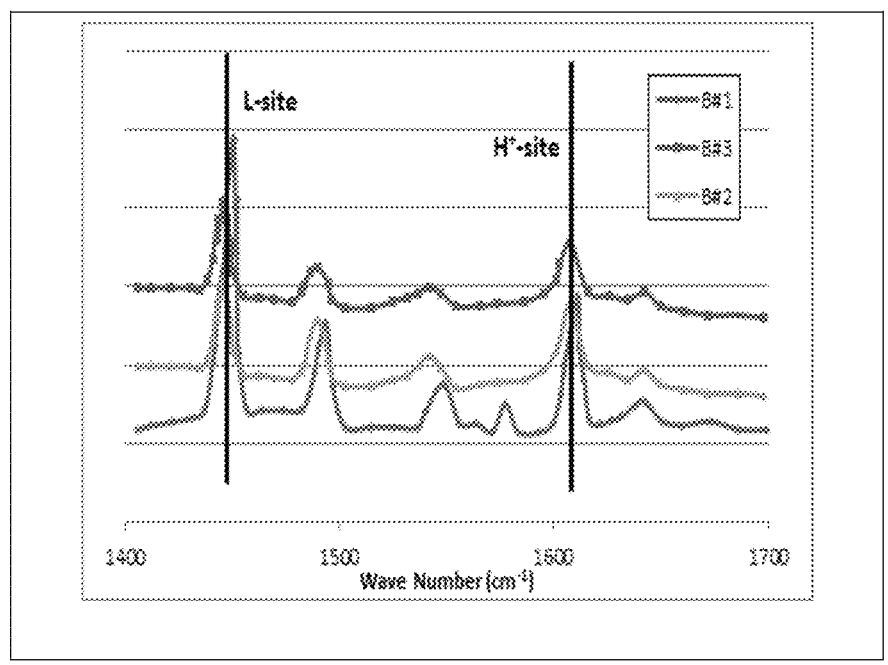
FIG. 1: illustrates the In-situ DRIFTS analysis.

The present invention provides a high coordination sulfated mixed metal oxide catalyst and process of synthesis of the same.

The main embodiment of the present invention provides a process and composition for preparation of a high coordination sulfated mixed metal oxide catalyst for hydrocarbon isomerization comprising the following the steps:
a. Preparing Zirconium nitrate or acetate solution by dissolving it in distilled water
b. Precipitating the Zirconium salt preferably Zirconium hydroxide using diethylamine and washing with double distilled water
c. Drying of Zirconium hydroxide salt
d. Loading sulfate ion on Zirconium hydroxide salt using Ammonium sulfate or Ammonium persulfate with ammonia as the competing ion
e. Reducing the particle size of sulfur loaded Zirconium salt by milling from 310 μm to 44 μm (or 325 mesh).
f. Mixing high surface area acidified Alumina after reducing the particle size by milling from 90 μm to 44 μm with the reduced particle size sulfur loaded Zirconium salt in a certain ratio in a ball mill to obtain a joint particle size of less than 37 μm (or 400 mesh).
g. Adding required quantity of above mixture with binder liquid comprising of α-amino acids, $HNO_3$ and $H_2SO_4$ and mixing using rapid mixer granulator followed by settling time of 30 minutes for peptizing.
h. Extruding the mixer with a single screw axial extruder
i. Drying the extrudates at 100-200° C. for 6 hours followed by calcinations at 600-800° C. for 3 hours
j. Adding a hydrogenating component (either Platinum and/or palladium to the catalyst extrudates)

Another embodiment of the present invention provides a process as herein described wherein the zirconium salt preferably Zirconium hydroxide is precipitated using diethylamine to obtain final pH of 9.0-11.0 as given in the step b.

Another embodiment of the present invention provides a process as herein described wherein the step c the drying of Zirconium hydroxide salt is carried out at 100 to 130° C. for 6 hrs.

Yet another embodiment of the present invention provides a process as herein described wherein the step d 12 to 14% sulfate ion is loaded on Zirconium hydroxide salt using Ammonium sulfate or Ammonium persulfate with ammonia as the competing ion.

Yet another embodiment of the present invention provides a process as herein described wherein the particle size of sulfur loaded Zirconium salt is reduced from 310 μm to preferably less than 44 μm by milling as indicated in the step e.

Yet another embodiment of the present invention provides a process as herein described wherein the particle size of high surface area acidified Alumina is also reduced from 90 μm to preferably less than 44 μm by milling as indicated in the step f.

Another embodiment of the present invention provides a process as herein described wherein Zirconium hydroxide and Alumina are added in the weight ratio of 3:1 to 5:1 and the mixture particle size is reduced by milling to preferably less than 37 μm (or 400 mesh).

Another embodiment of the present invention provides a process as herein described wherein the binder liquid added in the step g comprises of α-amino acids which are combination of α-amino acid with non-polar side chain from the group of Glycine, Alanine, Valine, Leucine, Isoleucine, Methionine, Proline and Phenylalanine, and α-amino acid with basic side chain from the group of Lysine, Arginine and Histidine.

Another embodiment of the present invention provides a process as herein described wherein the binder liquid added in the step g comprises of α-amino acids with overall molecular weight less than 250.

Another embodiment of the present invention provides molar concentration of α-amino acids with non-polar side chain is in the range of 1 to 2M.

Another embodiment of the present invention the molar concentration of α-amino acids with basic side chain is in the range of 2 to 3M while the molar concentration of $H_2SO_4$ and $HNO_3$ are 1.5 to 3M and 1.5 to 3M, respectively.

Another embodiment of the present invention provides a process as herein described wherein α-amino acids, $H_2SO_4$ and $HNO_3$ are mixed in weight ratio of 1:1:1 to 2.5:2.4:1.

Another embodiment of the present invention provides a process as herein described, wherein the pH of the peptizing agent comprising of $H_2SO_4$, $HNO_3$ and α-amino acids is maintained between 1.5 to 3.8.

Another embodiment of the present invention provides a process as herein described wherein the step (h) the mixer is extrudated with a single screw axial extruder with thickness of 1-2 mm.

Another embodiment of the present invention provides a process as herein described wherein in the step (i) the drying of extrudates will be carried out in the range of 100° to 200° C. and followed by calcination conducted in the range of 550 to 750° C.

Another embodiment of the present invention, binder ($Al_2O_3$) and support ($ZrO_2$) are intimately mixed by controlling the particle size to less than 37 μm of the corresponding precursors of these two components before the final catalyst shaping process.

Yet another embodiment of the present invention, mixture of acids includes α-amino acids with molecular weight less than 250 along with nitric and sulfuric acids such that the final pH of the acid mixtures is between 1.5 to 3.8.

Yet another embodiment of the present invention provides a catalyst mixture which retains high levels of sulfate species even at high temperatures. The presence of higher levels of sulfate leads to improved performance of the catalyst due to the presence of higher concentration of acidic sites on the catalyst surface.

Another embodiment of the present invention provides a selective combination of Alumina/Zirconia that leads to a high coordination number in the mixed metal oxide composition.

Yet another embodiment of the present invention provides a catalyst having high coordination number. High coordination number allows for higher retention of acidic sites leading to increased performance of the catalyst towards hydrocarbon reactions.

Another embodiment of the present invention provides a catalyst having crushing strength greater than 2.0 daN, preferably in range of 2.0 daN and 5.0 daN.

Three methods of catalyst synthesis have been demonstrated here. The first example corresponds to the synthesis of the catalyst as per invention. The second example is a comparative catalyst that is synthesized using the method as per the invention without reduction in particle size. The third example describes the synthesis method as per conventional methods.

Example 1

Preparation of the Catalyst

Zirconium nitrate or acetate is first dissolved in distilled water (TDS<10) to obtain a concentration of 0.32 M. The Zirconium salt is then precipitated using diethylamine to obtain a final pH of 9.5. The precipitated Zirconium hydroxide is washed with double distilled water until no remnant anion from the precursor is left behind. The Zirconium hydroxide is dried at 110° C. for 6 hours. The dried Zirconium hydroxide is loaded with 12% sulfate ion using Ammonium sulfate or Ammonium persulfate with Ammonia as the competing ion. The sulfur loaded hydroxide that initially had a particle size (d98 using Melvern particle size analyzer) of around 310 μm is then milled to a particle size less than 44 μm, referred to as "A". High surface area acidified Alumina ($Al_2O_3$) is taken in parallel to act as binder for the catalyst. The average particle size of this commercially available acidic Alumina binder was measured to be around 90 μm (d98). This $Al_2O_3$ is milled to less than 44 μm, referred to as B. Finally, 27.8 g of A and 7.2 g of B are mixed in a ball mill to obtain a joint particle size of 37 μm (d98 using Melvern particle size analyzer). The mixture of A and B thus produced are then mixed with 17.7 g of binder liquid comprising of 3.7 g of at least two α-amino acids wherein the said acids were a combination of 1.5M α-amino acid with non-polar side chain from the group of Glycine, Alanine, Valine, Leucine, Isoleucine, Methionine, Proline and Phenylalanine, and 2.5M α-amino acid with basic side chain from the group of Lysine, Arginine and Histidine with overall molecular weight less than 250, 7 g of 2.3M $HNO_3$ and 7 g of 2.1M $H_2SO_4$ and settled for 30 min to peptize the desired mixture. The total liquid used for peptization was around 17.7 g. The pH of the peptization liquid was 2.7. A, B and the binder fluid are mixed using rapid mixer granulator equipment at an rpm of 143 rpm for 2 hours. The final particle size of the mixture from a sample taken from the rapid mixer granulator was measured to be 37 μm. The mixture is then extruded with a single screw axial extruder with thickness of 2 mm. The extrudates are dried at 150° C. for 6 hours and subsequently calcined at 700° C. for 3 hours. The presence of α-amino acid selectively coupled the Zirconia and the Alumina structures and produces 12% sulfate loaded sulfated Zirconia-Alumina mixed metal oxide catalyst. To verify the performance of the catalyst using C5/C6 isomerization as the probe reaction, a hydrogenating component (either Platinum or Palladium or both) was added to the catalyst extrudates to obtain a final level of 0.3 mole % on a Platinum basis. The catalyst sample prepared under this example is referred as catalyst-1.

Example 2

Comparative Catalyst—

Sulfur loaded Zirconium hydroxide is prepared as per example 1 with particle size of around 310 μm (d98) and is labeled "A". High surface area is binder acidic Alumina is taken as per example 1 and is labeled "B". The average particle size of this commercially available acidic Alumina binder was measured to be around 90 μm (d98). A and B are mixed in the same ratio as example 1 using 13.4 g of binder liquid comprising of 2.3M $HNO_3$ and 3.7 g α-amino acids wherein the said acids were a chosen from the list containing Glycine, Alanine, Valine, Leucine, Isoleucine, Methionine, Proline and Phenylalanine with molecular weight less than 250. The total pH of the peptization liquid was 3.9. The total volume was kept same as in example 1 and the ratio of amino acid to the mineral acid kept constant, as the peptizing agent using rapid mixer granulator equipment at an rpm of 143 rpm for 2 hours. The final particle size of the mixture of A+B was measured to be 55 μm (d98) using Melvern particle size analyzer. The extrudates are dried at 150° C. for 6 hours and subsequently calcined at 700° C. for 3 hours. The comparative catalyst led to non-selective binding of Zirconia and Alumina and led to the formation of a mixed oxide catalyst with 10.4% sulfate loaded sulfated Zirconia-Alumina mixed metal oxide catalyst. To verify the performance of the comparative catalyst using C5/C6 isomerization as the probe reaction, a hydrogenating component (either Platinum or Palladium or both) was added to the catalyst extrudes to obtain a final level of 0.3 mole % on a Platinum basis. The catalyst sample prepared under this example is referred as catalyst-2.

Example 3

Comparative—Conventional—

The sulfur loaded Zirconium hydroxide having particle size of around 310 μm (d98) and is labeled "A" is prepared as per example 1. High surface area acidified Alumina ($Al_2O_3$) is taken in parallel to act as binder for the catalyst but is not sieved and is labeled "B". The average particle size of this commercially available acidic Alumina binder was measured to be around 90 μm (d98). A and B are mixed in the same ratio as example 1 using 17.7 g of 2.3M $HNO_3$ as the peptizing agent using a rapid mixer granulator equipment at an rpm of 143 rpm for 2 hours. The pH of the peptizing agent was 1.2. The final particle size of the mixture of A+B was measured to be 76 μm (d98) using Melvern particle size analyzer. The extrudates are dried at 150° C. for 6 hours and subsequently calcined at 700° C. for 3 hours. The comparative catalyst led to non-selective binding of Zirconia and Alumina and led to the formation of a mixed oxide catalyst with 8.3% sulfate loaded sulfated Zirconia-Alumina mixed metal oxide catalyst. To verify the performance of the comparative catalyst using C5/C6 isomerization as the probe reaction, a hydrogenating component (either Platinum or Palladium or both) was added to the catalyst extrudes to obtain a final level of 0.3 mole % on a Platinum basis. The catalyst sample prepared under this example is referred as catalyst 3.

The experimental validations presented herein conclusively demonstrate three integral attributes of the catalyst.
  a) Intimate contact of Zr—Al bond resulting in retardation of crystal growth during calcination (reduced ostwalde's ripening);
  b) Increase in Zr3d dispersion on the surface (higher Miller index);
  c) Increase in the medium strength Lewis acid sites on the surface of the catalyst.

The consequence of the three critical attributes demonstrated with the experimental data result in a catalyst with high crushing strength suitable for commercial application while concurrently offering high performance efficacy.

1) In-Situ DRIFTS Analysis

Increase in the strength of the medium strength Lewis acid sites is measured using 2,6-dimethyl pyridine using in-situ vacuum adsorption. The catalyst surface is evacuated at 250° C. under vacuum and a stream of 2,6-DMP is flown on the surface of the catalyst in an in-situ DRIFTS instrument. The frequency of the various bonds is measured using infrared spectroscopy. A Thermo Fisher Nicolet 6700 DRIFTS apparatus was used to conduct the study. The IR interpretation was done using Thermo Scientific OMNIC software for recording spectral data and WatLow EZ-Zone configurator software for conducting temperature-controlled experiments. The results of the experiments are depicted in FIG. 1 and table 1.

TABLE 1

| B#1 | B#2 | B#3 |
|---|---|---|
| L site = 365 (umol/g) | L site = 278 (umol/g) | L site = 247 (umol/g) |

*B#1, B#2 and B#3 in the above figure correspond to Cat 1, 2 and 3 respectively.

Based on the analysis the strength of the Lewis acid sites which are responsible for larger reaction rates have been increased by nearly a factor of 1.47.

2) Extended X-Ray Absorption Fine Structure (EXAFS)

The energy scale was calibrated with reference to $4f_{7/2}$ level of freshly evaporated gold sample. A monochromatic electronic flood gun was used to compensate charge build up on the sample. Also, care was taken that there is no change in the Zr—O—K-edge spectra before sample measurement.

TABLE 2

|  | Catalyst # 1 | Catalyst # 2 | Catalyst # 3 |
|---|---|---|---|
| Zr—Zr (Al) atomic radius (Å) | 2.47 Å | 2.63 Å | 2.92 Å |

Å stands for Angstrom (Units used to measure atomic radius).

The Zr—Zr—Al bond length was measured using EXAFS. The overall bond length between Zr—Zr—Al was reduced by nearly 15%. It is well reported in the literature that the presence of Al near the Zr atom reduces the tendency of the $ZrO_2$ to form thermodynamically stable monoclinic structure. Presence of Al will allow $ZrO_2$ to maintain the metaphysical tetragonal and cubic structure where the coordination with $SO_3$ will lead to higher concentration of medium strength Lewis acid sites.

3) X-Ray Photoelectron Spectroscopy (XPS)

Binding energy of the Zr3d orbital was measured using XPS. Ultra-high vacuum of $P<10^{-9}$ mbar was maintained throughout the course of the measurement to obtain the desired results. Peak analysis was performed by acknowledging the three peaks typically observed in sulfated zirconia-alumina catalysts. The peak specifically corresponding to binding energy (B.E.) of 185.4 eV corresponds to the medium strength Lewis acid sites needed for high reaction rates. The peak resolution was done and the area corresponding to the medium strength Lewis acid sites were compared. The higher binding energy corresponding to the medium strength Lewis acid sites is evident from catalyst #1 in comparison to catalyst #2 and catalyst #3. This increased site density of medium strength Lewis acid sites will lead significantly higher overall isomerization reaction activity.

Figure 2A:
FIG. 2A-C: illustrates the X-ray Photoelectron spectroscopy (XPS)
Figure 2A:
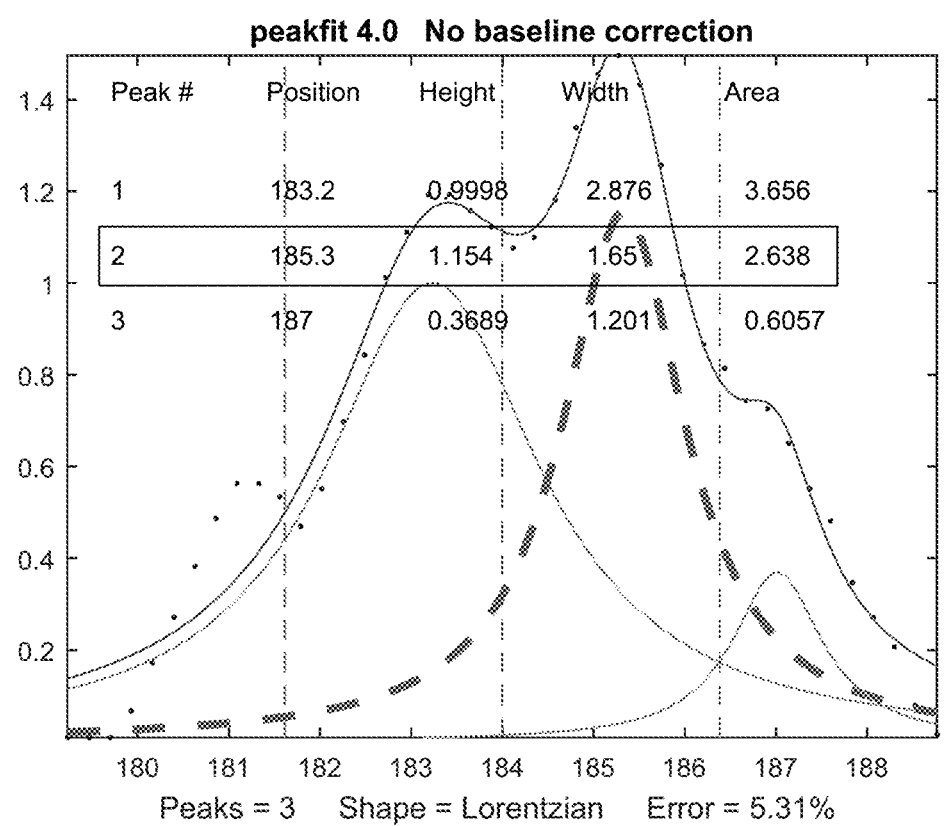
Figure 2B:
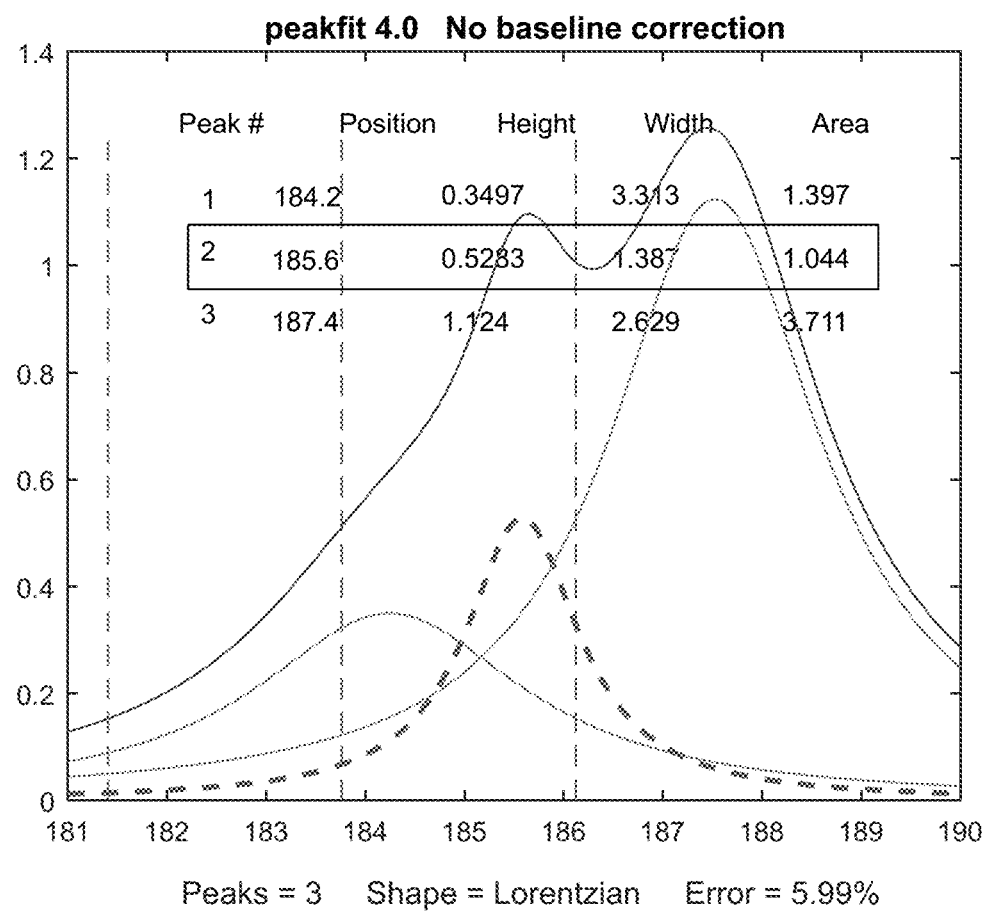
Figure 2C:
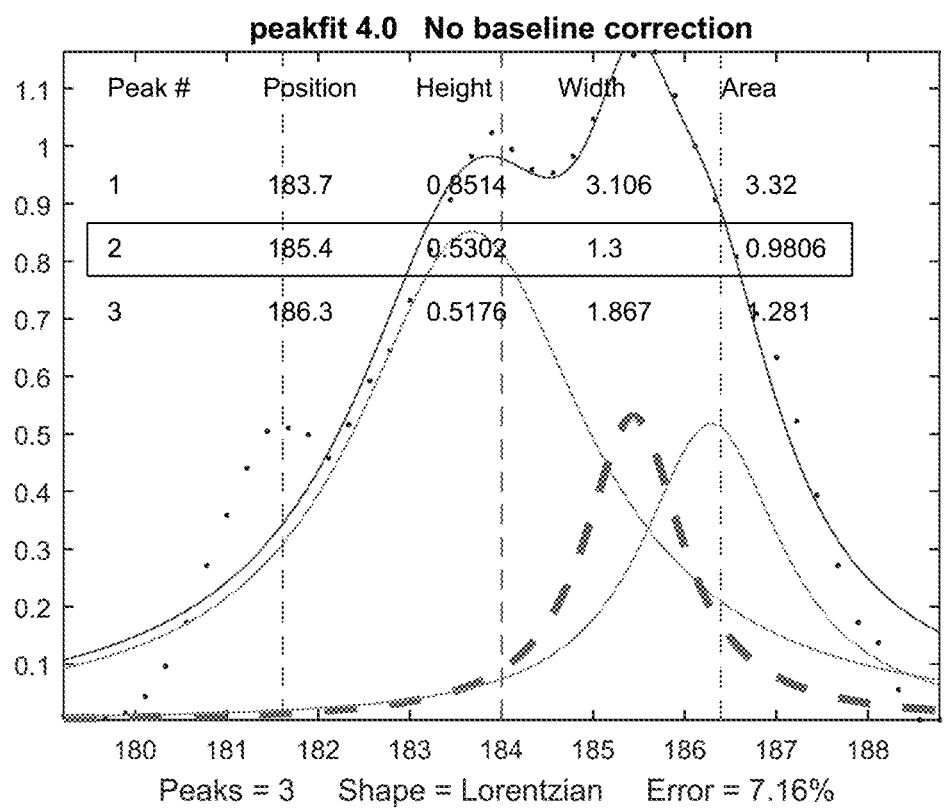

The overall relative strength of the medium strength Lewis acid site is demonstrated by Area #2 in FIGS. 2A-C.

Clearly the Cat 1 shows superior strength of the desired medium strength Lewis acid sites.

Further, the performance evaluation of the catalyst samples as mentioned in Example-1, 2 and 3 were carried out in micro-reactor set-up. The evaluation was carried out using light naphtha feed whose composition is given below:

TABLE 3

| Component | Wt % |
|---|---|
| Cyclopentane | 1.20 |
| i-Pentane | 0.54 |
| n-Pentane | 6.72 |
| 22DMB | 2.70 |
| 23DMB | 5.92 |
| n-Hexane | 20.41 |
| 2MP | 25.19 |
| 3MP | 17.68 |
| Benzene | 2.22 |
| Cyclohexane | 3.97 |
| Methyl cyclopentane | 11.14 |
| $C_7+$ | 2.32 |

The evaluation was conducted at WHSV of 1.5, $H_2$/HC ratio of 2.4, reaction pressure of 20 bar and reaction temperature of 200° C. The evaluation results are given below:

TABLE 4

| Catalyst | n-Pentane conversion, wt % | n-Hexane conversion, wt % | Benzene conversion, wt % | Δ RON (Product-feed) |
|---|---|---|---|---|
| Catalyst# 1 | 53.6 | 41.8 | 100 | 9.1 |
| Catalyst# 2 | 47.8 | 38.6 | 100 | 7.9 |
| Catalyst# 3 | 24.2 | 30.4 | 75.5 | 5.4 |

The $C_{5+}$ product composition obtained after evaluation of each catalyst samples are also given below:

TABLE 5

| Product composition (wt. %) | Catalyst# 1 | Catalyst# 2 | Catalyst# 3 |
|---|---|---|---|
| Cyclopentane | 0.90 | 0.90 | 1.10 |
| i-Pentane, wt % | 5.88 | 4.71 | 3.93 |
| n-Pentane, wt % | 3.25 | 3.32 | 5.38 |
| Benzene, wt % | 0.00 | 0.00 | 0.26 |
| Cyclohexane, wt % | 3.38 | 3.94 | 4.72 |
| Methyl cyclopentane, wt % | 6.68 | 7.79 | 9.14 |
| 22DMB, wt % | 12.58 | 10.74 | 4.79 |
| 23DMB, wt % | 8.41 | 8.55 | 8.22 |
| n-Hexane, wt % | 12.38 | 12.78 | 14.39 |
| 2MP, wt % | 27.14 | 27.76 | 26.65 |
| 3MP, wt % | 16.50 | 16.87 | 16.24 |
| C7+, wt % | 2.90 | 2.65 | 5.17 |

On comparing the evaluation results, the performance of Catalyst 1 is found to be best among three.

Crushing strength of Cat 1, 2 and 3 were done using a single grain crushing strength analyzer supplied by Vinci Technologies. A comparison of the crushing strength of both the samples is detailed below, which indicates highest crushing strength for Cat 1:

TABLE 6

| Catalyst sample | Crushing strength, daN |
|---|---|
| Catalyst# 1 | 2.23 |
| Catalyst# 2 | <0.5 |
| Catalyst# 3 | <0.3 |

Advantages of the Present Invention a) a method of preparation of high coordination sulfated mixed metal oxide catalyst leading to increased reaction efficacy.
b) catalyst with high thermal stability required to produce optimal Lewis acidity of the catalyst.
c) catalyst having higher sulfate species retention which leads to optimal Bronsted acidity of the catalyst.
d) better performance of the catalyst for use in hydrocarbon isomerization in terms of conversion of reactants.
e) better catalyst life without loss of its activity.
f) catalyst having higher crushing strength for commercial application in commercial fixed bed.

What is claimed is:

1. A process for synthesis of high coordination sulfated mixed metal oxide catalyst, the process comprising:
   a) dissolving Zirconium nitrate or acetate in distilled water;
   b) precipitating Zirconium hydroxide using diethylamine, washing with double distilled water, and drying;
   c) loading sulfate ions on the dried Zirconium hydroxide using Ammonium sulfate or Ammonium persulfate with ammonia as a competing ion;
   d) reducing particle size of the sulfate ions loaded Zirconium hydroxide obtained in step (c) from 310 μm to 44 μm by milling;
   e) reducing particle size of high surface area acidified alumina from 90 μm to 44 μm by milling, and further mixing with the sulfate ions loaded Zirconium hydroxide obtained in step (c) in a ball mill to obtain a joint particle size of less than 37 μm;
   f) adding the mixture obtained in step (e) to a binder liquid comprising α-amino acids, $HNO_3$ and $H_2SO_4$ and mixing to maintain a pH in a range of 1.5 to 3.8, wherein the α-amino acids are a combination of α-amino acid with a non-polar side chain and α-amino acid with a basic side chain;
   g) peptizing followed by extruding after settling the mixture obtained in step f) for 30 minutes;
   h) drying the extrudates obtained in step g) at 100-200° C. for 6 hours followed by calcination; and
   i) adding a hydrogenating component.

2. The process as claimed in claim 1, wherein α-amino acids, $H_2SO_4$, and $HNO_3$ are in a weight ratio of 1:1:1 to 2.5:2.4:1.

3. The process as claimed in claim 1, wherein pH of the Zirconium hydroxide obtained in step (b) is in a range of 9.0-11.0.

4. The process as claimed in claim 1, wherein drying in step (c) is carried out at a temperature of 100 to 130° C. for 6 hours.

5. The process as claimed in claim 1, wherein an extruder in step (g) is a single screw axial extruder having a thickness of 1-2 mm.

6. The process as claimed in claim 1, wherein the calcination in step (h) is carried out at a temperature range of 550 to 800° C. for 3 hours.

7. The process as claimed in claim 1, wherein the hydrogenating component is selected from Platinum, Palladium, and a combination thereof.

8. The process as claimed in claim 1, wherein the α-amino acid with the non-polar side chain is selected from Glycine, Alanine, Valine, Leucine, Isoleucine, Methionine, Proline and Phenylalanine; with molar concentration in a range of 1 to 2M.

9. The process as claimed in claim 1, wherein, the α-amino acid with the basic side chain is selected from Lysine, Arginine and Histidine, with molar concentration in a range of 2 to 3M.

\* \* \* \* \*